US010674707B1

(12) United States Patent
Srinivasan (10) Patent No.: US 10,674,707 B1
(45) Date of Patent: Jun. 9, 2020

(54) AUTOMATIC PET PAW WASHER

(71) Applicant: Srikar Srinivasan, East Brunswick, NJ (US)

(72) Inventor: Srikar Srinivasan, East Brunswick, NJ (US)

(*) Notice: Subject to any disclaimer, the term of this patent is extended or adjusted under 35 U.S.C. 154(b) by 0 days.

(21) Appl. No.: 16/564,554

(22) Filed: Sep. 9, 2019

(51) Int. Cl.
*A01K 13/00* (2006.01)

(52) U.S. Cl.
CPC ................................. *A01K 13/001* (2013.01)

(58) Field of Classification Search
CPC ............................ A01K 13/001; A47K 3/022
USPC ............................................................ 4/622
See application file for complete search history.

(56) References Cited

U.S. PATENT DOCUMENTS

| | | | | | |
|---|---|---|---|---|---|
| 1,879,915 | A | * | 9/1932 | Smoot | A01K 13/001 119/665 |
| 2,536,943 | A | * | 1/1951 | Kessel | A01K 13/001 119/676 |
| 3,023,734 | A | * | 3/1962 | Schaub | A01K 1/0613 119/729 |
| 3,884,191 | A | * | 5/1975 | Stout | A01K 13/001 119/671 |
| 4,056,078 | A | * | 11/1977 | Blafford | A01K 13/001 119/671 |
| 4,407,234 | A | * | 10/1983 | Kleman | A01K 13/001 119/672 |
| 4,485,503 | A | * | 12/1984 | Rolando | A47K 3/022 4/622 |
| 4,505,229 | A | * | 3/1985 | Altissimo | A01K 13/001 119/668 |
| 4,559,903 | A | * | 12/1985 | Bloom | A01K 13/001 119/416 |
| 4,782,792 | A | * | 11/1988 | Anthony | A01K 13/001 119/665 |
| 5,435,269 | A | * | 7/1995 | Chen | A01K 13/001 119/668 |
| 5,448,966 | A | * | 9/1995 | McKinnon | A01K 13/001 119/676 |
| 5,632,231 | A | * | 5/1997 | Moore | A01K 13/001 119/671 |
| 6,161,227 | A | * | 12/2000 | Bargenquast | A47K 1/04 134/58 R |

(Continued)

FOREIGN PATENT DOCUMENTS

| | | | | |
|---|---|---|---|---|
| DE | 3926256 A1 | * | 2/1991 | A47K 3/022 |
| GB | 190902227 A | * | 4/1909 | A47K 3/283 |
| WO | WO-2007037947 A2 | * | 4/2007 | A47K 3/022 |

*Primary Examiner* — Magdalena Topolski
*Assistant Examiner* — Morgan T Barlow
(74) *Attorney, Agent, or Firm* — Walter J. Tencza, Jr.

(57) ABSTRACT

An apparatus including a device which can be put in a first state or a second state; a water supplying unit; and a dryer unit. The device may have one or more openings leading to one or more inner chambers. In the second state the one or more openings of the device may be larger than in the second state. A pet can insert one or more paws into the one or more inner chambers, through the one or more openings in the second state. The water supplying unit may supply water to the one or more inner chambers to wash one or more paws of the pet, while they are in the one or more inner chambers. The dryer unit may supply hot air to the one or more inner chambers to dry the one or more paws of the pet, while in the one or more inner chambers.

28 Claims, 6 Drawing Sheets

(56) References Cited

U.S. PATENT DOCUMENTS

| | | | | |
|---|---|---|---|---|
| 6,439,160 B1* | 8/2002 | Wheelwright | A01K 13/001 | 119/165 |
| 6,745,721 B1* | 6/2004 | Hammer | A01K 13/001 | 119/664 |
| 6,931,675 B1* | 8/2005 | Hager | A47K 3/022 | 4/622 |
| 7,107,937 B1* | 9/2006 | Anderson | A01K 13/001 | 119/665 |
| 7,921,812 B1* | 4/2011 | Carrillo | A01K 13/001 | 119/602 |
| 8,069,821 B1* | 12/2011 | Green | A01K 13/001 | 119/671 |
| 8,122,852 B2* | 2/2012 | Skibinski | A01K 13/001 | 119/673 |
| 8,413,610 B1* | 4/2013 | Fultz | A01K 13/001 | 119/665 |
| 8,544,419 B1* | 10/2013 | Spalding | A01M 1/06 | 119/651 |
| 9,078,413 B1* | 7/2015 | Docy | A01K 13/001 | |
| 2005/0015874 A1* | 1/2005 | Watanabe | A61H 35/006 | 4/622 |
| 2005/0224013 A1* | 10/2005 | Bestelmeyer | A01K 13/001 | 119/651 |
| 2007/0039559 A1* | 2/2007 | Foster | A01K 13/001 | 119/676 |
| 2007/0050906 A1* | 3/2007 | Cohen | A61H 35/006 | 4/622 |
| 2007/0163515 A1* | 7/2007 | Yoerg | A01K 13/001 | 119/673 |
| 2007/0186342 A1* | 8/2007 | Condon | A61H 35/006 | 4/622 |
| 2008/0121189 A1* | 5/2008 | Greeson | A01K 13/001 | 119/666 |
| 2008/0190375 A1* | 8/2008 | German | A01K 13/001 | 119/606 |
| 2009/0173286 A1* | 7/2009 | Schetlin | A01K 13/001 | 119/606 |
| 2009/0178626 A1* | 7/2009 | Greeson | A01K 13/001 | 119/651 |
| 2010/0083522 A1* | 4/2010 | Tritz | A01K 13/001 | 34/229 |
| 2010/0324611 A1* | 12/2010 | Deming | A43B 3/0005 | 607/2 |
| 2011/0017147 A1* | 1/2011 | Petruzzi | A01K 13/001 | 119/604 |
| 2011/0061602 A1* | 3/2011 | Moharram | A01K 13/001 | 119/651 |
| 2011/0083613 A1* | 4/2011 | Redick | A01K 13/001 | 119/671 |
| 2011/0239955 A1* | 10/2011 | Miller | A01K 13/001 | 119/673 |
| 2011/0297103 A1* | 12/2011 | Iou | A01K 13/001 | 119/676 |
| 2012/0037085 A1* | 2/2012 | Caisse | A01K 13/001 | 119/676 |
| 2014/0150176 A1* | 6/2014 | Tran | A61H 35/006 | 4/622 |
| 2015/0059658 A1* | 3/2015 | Whitsett | A01K 13/001 | 119/671 |
| 2015/0107017 A1* | 4/2015 | Haddad | A47K 3/022 | 4/556 |
| 2015/0189857 A1* | 7/2015 | Qirjazi | A01K 13/001 | 119/668 |
| 2015/0201583 A1* | 7/2015 | Greeson | A01K 13/003 | 119/651 |
| 2015/0366163 A1* | 12/2015 | Carter | A01K 13/001 | 119/678 |
| 2016/0100551 A1* | 4/2016 | Hanneken | A01K 13/001 | 119/673 |
| 2016/0128302 A1* | 5/2016 | Stauber | A01K 13/001 | 119/671 |
| 2017/0094939 A1* | 4/2017 | Wright | A01K 13/001 | |
| 2017/0303506 A1* | 10/2017 | Wold | A01K 13/004 | |

* cited by examiner

AUTOMATIC PET PAW WASHER

FIELD OF THE INVENTION

This invention relates to devices for washing pet paws.

BACKGROUND OF THE INVENTION

Pets walking into the house after playing outside carry dirt and mud in their paws resulting in messy homes. Their paws need to be cleaned after walking or playing in snow or mud. Available devices known in the market require pet owners to take each paw and put it in a tube like device and clean them. Each paw needs to be cleaned one at a time and the pet may not stand quietly. If they try to move, their legs may be injured. Also, sometimes a pet may kick the device and water may spill into the carpet or floor. In addition, water needs to be changed for each paw and the pets may not stand in the same spot while the owners bring clean water for each and every paw. Available units do not have dryers and the pets may walk away with wet paws causing water marks on the floors and may lead to a slip and fall.

SUMMARY OF THE INVENTION

At least one embodiment of the present invention provides a device which helps pet owners to clean and dry all four paws of their pets automatically at the same time.

At least one embodiment of the present invention prevents spillage of water on the floor and prevents injuries to pets and owners. Since pet owners do not have to lift the paws and put them individually in the device, the device also prevents injuries to pets.

At least one embodiment of the present invention dries the paws automatically.

In at least one embodiment of the present application, the apparatus includes a device which can be put in a first state or a second state; a water supplying unit; and a dryer unit. The device may have one or more openings leading to one or more inner chambers. In the second state the one or more openings of the device may be larger than in the first state.

The device may be configured so that a pet can insert one or more paws into the one or more inner chambers, through the one or more openings in the second state. The water supplying unit may be configured to supply water to the one or more inner chambers to wash at least part of the one or more paws of the pet, while the one or more paws of the pet are in the one or more inner chambers. The dryer unit may be configured to supply hot air to the one or more inner chambers to dry the one or more paws of the pet, while the one or more paws of the pet are in the one or more inner chambers.

In at least one embodiment of the present invention, the device includes a first left front flap and a second left front flap; a first left rear flap and a second left rear flap; a first right front flap and a second right front flap; and a first right rear flap and a second right rear flap.

The device may include a bottom member on which the pet can stand in the second state; wherein in the second state, the first left front flap, the second left front flap, the first left rear flap, the second left rear flap, the first right front flap, the second right front flap, the first right rear flap, the second right rear flap are at an angle to the bottom member; wherein in the first state, the first left front flap, the second left front flap, the first left rear flap, the second left rear flap, the first right front flap, the second right front flap, the first right rear flap, and the second right rear flap are substantially parallel to the bottom member; wherein there is an opening between the first left front flap and the second left front flap which is smaller in the first state than the second state, to provide greater restriction to movement of a first paw of the pet in the second state than in the first state; wherein there is an opening between the first left rear flap and the second left rear flap which is smaller in the first state than the second state, to provide greater restriction to movement of a second paw of the pet in the first state than in the second state; wherein there is an opening between the first right front flap and the second right front flap which is smaller in the first state than the second state, to provide greater restriction to movement of a third paw of the pet in the first state than in the second state; and wherein there is an opening between the first right rear flap and the second right rear flap which is smaller in the first state than the second state, to provide greater restriction to movement of a fourth paw of the pet in the first state than in the second state.

In the second state, the first left front flap, the second left front flap, the first left rear flap, the second left rear flap, the first right front flap, the second right front flap, the first right rear flap, the second right rear flap may be substantially perpendicular to the bottom member.

The device may include a first ramp; wherein the device includes a bottom member on which the pet can stand in the first state; wherein the first ramp is configured to be changed from a first orientation to a second orientation with respect to the bottom member to allow the pet to walk onto the bottom member by first walking onto the first ramp, and then off of the first ramp in the second orientation and onto the bottom member; and wherein the first ramp is configured to be put back in the first orientation from the second orientation with respect to the bottom member to form part of an enclosure for retaining water and hot air inside the one or more inner chambers of the device. The first ramp may be substantially perpendicular to the bottom member in the first orientation.

The device may include a second ramp; wherein the second ramp is configured to be changed from a third orientation to a fourth orientation with respect to the bottom member to allow the pet to walk onto the bottom member by first walking onto the second ramp in the fourth orientation, and then off of the second ramp and onto the bottom member; wherein the second ramp is configured to be placed back in the third orientation from the fourth orientation with respect to the bottom member to form part of an enclosure for retaining water and hot air inside the one or more inner chambers of the device; and wherein the first ramp located opposite the second ramp.

The first ramp may be substantially perpendicular to the bottom member in the first orientation; and the second ramp may be substantially perpendicular to the bottom member in the third orientation.

In at least one or more embodiments, the device may include one or more pipes which are connected to the water supplying unit, which are located in the one or more inner chambers of the device, and which have a plurality of openings through which water is supplied to the one or more inner chambers of the device; and the device may include one or more pipes which are connected to the dryer unit, which are located in the one or more inner chambers of the device, and which have a plurality of openings through which hot air is supplied to the one or more inner chambers of the device.

In at least one or more embodiments, of the present application, the device includes a bottom member on which the pet can stand in the first state; and wherein the bottom member includes a plurality of openings through which water can pass from inside the one or more inner chambers to flow out of the one or more inner chambers.

The device may further include a drawer; wherein the drawer may be configured to be placed in a collecting state such that the drawer is underneath the bottom member, and collects water which passes from inside the one or more inner chambers through the plurality of openings of the bottom member to outside the one or more inner chambers; and wherein the drawer may be configured to be placed in a removed state, such that the drawer is no longer beneath the bottom member which allows water that has been collected by the drawer to be dumped out of the drawer.

In at least one embodiment of the present application, a method is provided comprising changing a device from a first state to a second state; inserting one or more paws of a pet into one or more inner chambers of the device in the second state; supplying water to the one or more inner chambers to wash at least part of the one or more paws of the pet, while the one or more paws of the pet are in the one or more inner chambers and while the device is in the second state; and supplying hot air to the one or more inner chambers to dry the one or more paws of the pet, while the one or more paws of the pet are in the one or more inner chambers, and while the device is in the second state.

The device may be configured as previously specified.

DETAILED DESCRIPTION OF THE DRAWINGS

Figure 1A:
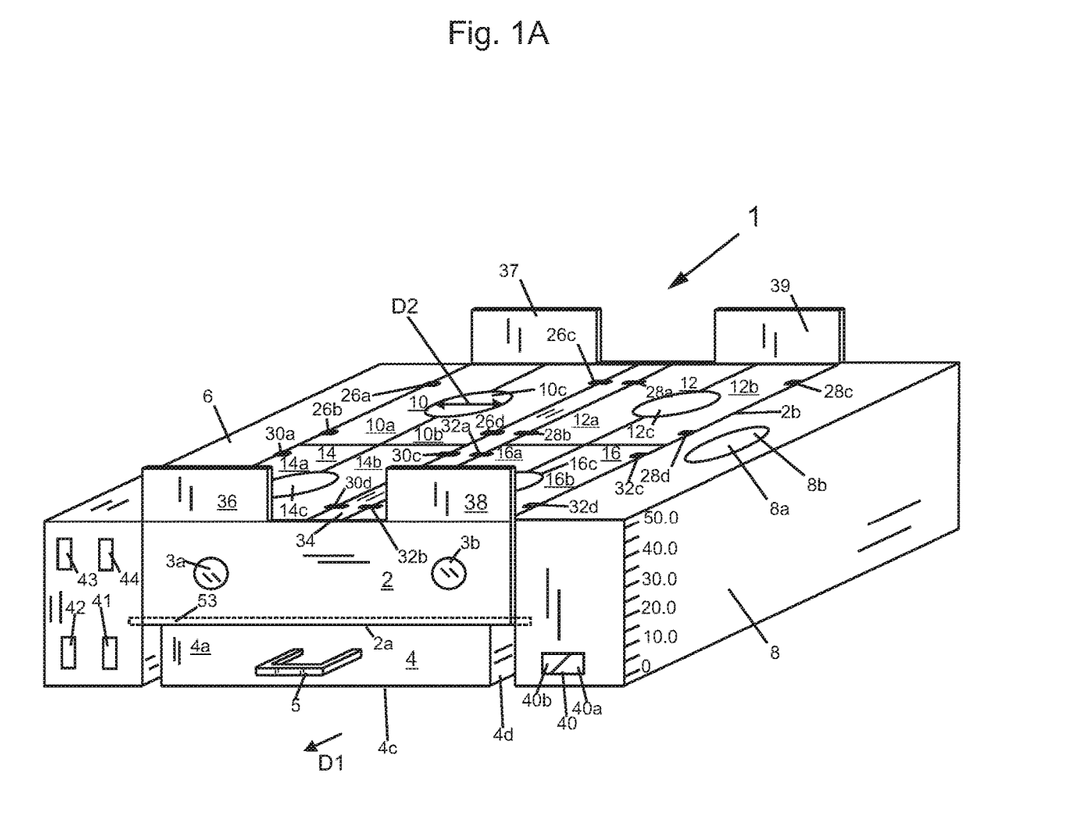
FIG. 1A shows a top, front, and right perspective view of an apparatus in accordance with an embodiment of the present invention, with the apparatus of FIG. 1A shown in a first state.
Figure 1B:
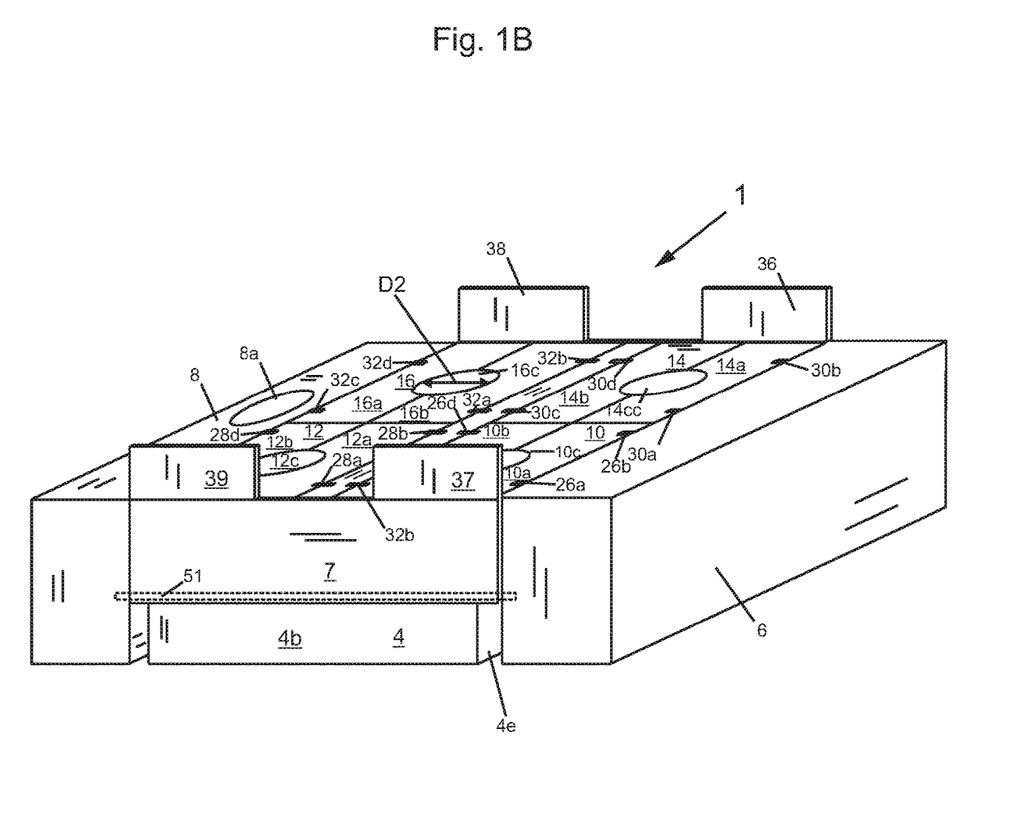
FIG. 1B shows a top, rear, and left perspective view of the apparatus of FIG. 1A shown in the first state.

FIG. 1A shows a top, front, and right perspective view of an apparatus 1 in accordance with an embodiment of the present invention, with the apparatus 1 shown in a first state. FIG. 1B shows a top, rear, and left perspective view of the apparatus 1 of FIG. 1A shown in the first state.

Referring to FIGS. 1A and 1B, the apparatus 1 may include one or more components, such as but not limited to, clean water storage unit 8; motor pump and dryer unit 6; soiled water drain container or drawer 4; collapsible sleeves 10, 12, 14, and 16; pet climb up ramp 2, and pet climb up ramp 7 (shown in FIG. 1B).

Figure 2A:
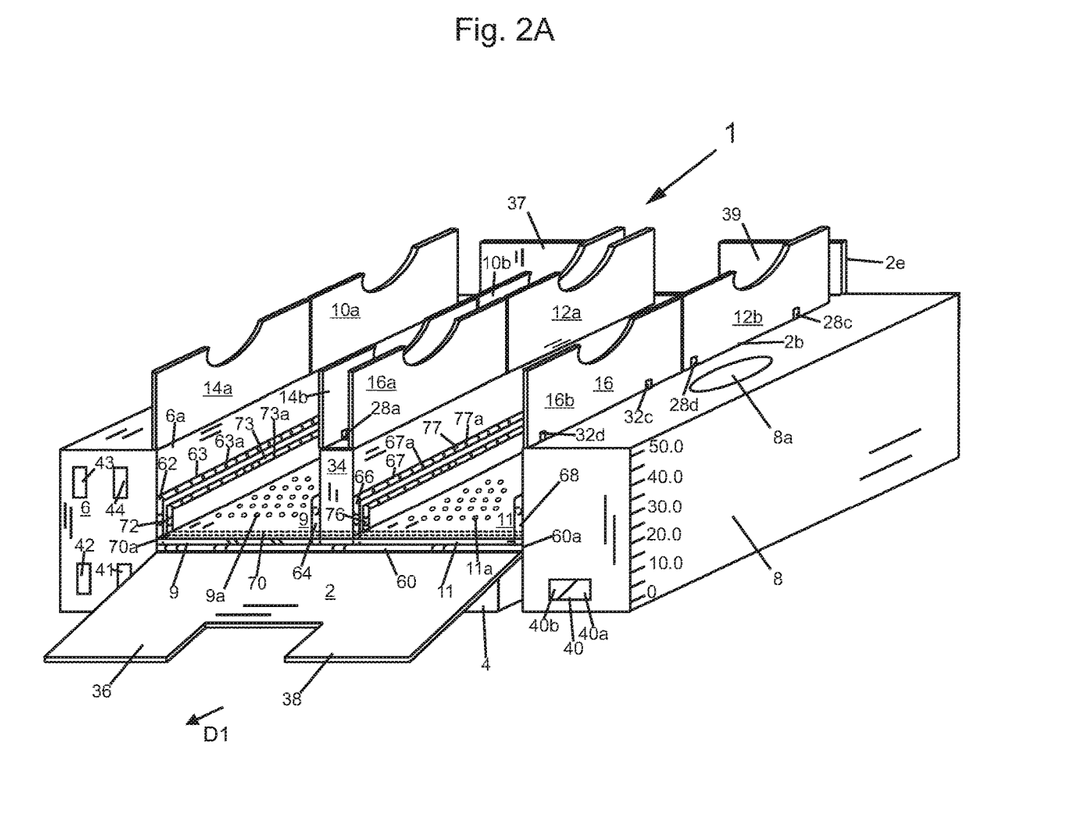
FIG. 2A shows a top, front, and right perspective view of the apparatus of FIG. 1A, with the apparatus of FIG. 1A shown in a second state.
Figure 2B:
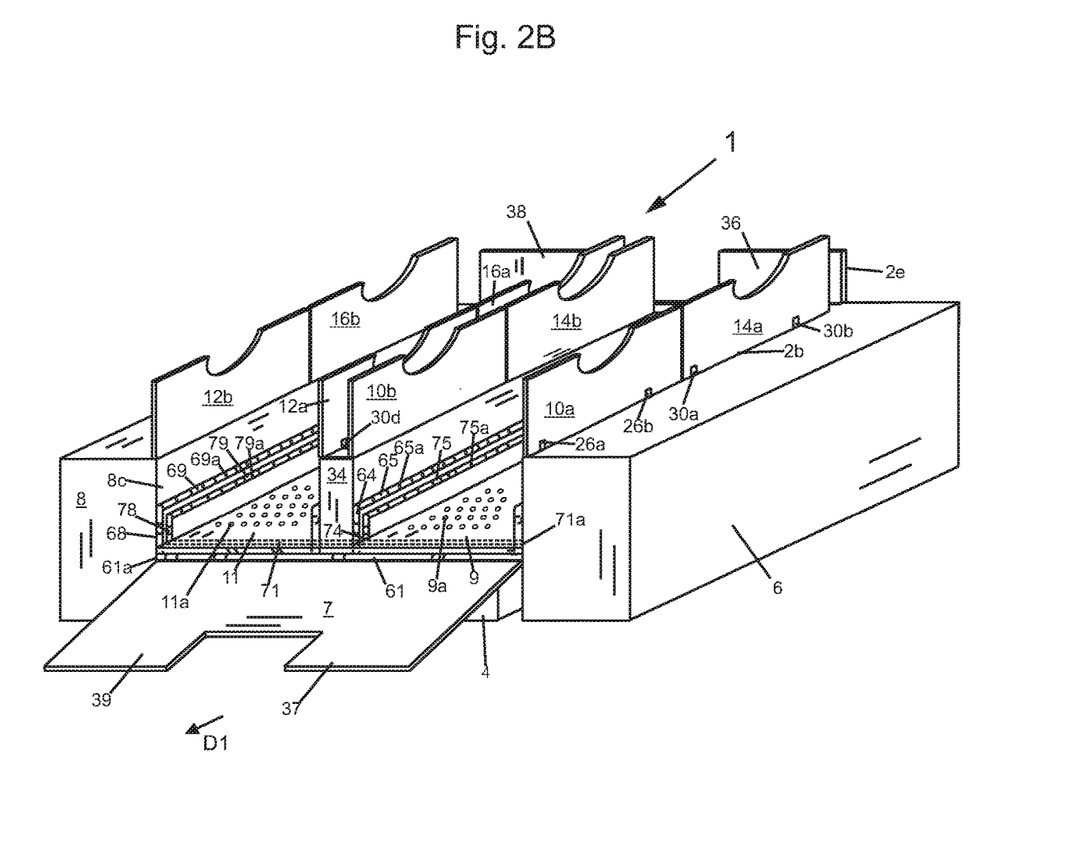
FIG. 2B shows a top, rear, and left perspective view of the apparatus of FIG. 1A, with the apparatus of FIG. 1A shown in a third state.

A combination of at least one or more of the components 4, 10, 12, 14, 16, 2, and 7 may be described as a device which can be put into at least a state as shown in FIGS. 1A-B and in a state as shown in FIGS. 2A-B.

The pet climb up ramp 2 may be pivotally attached to front wall 4a of the drawer 4 by bar 53, which is shown in dashed lines in FIG. 1A, and which passes through, for example, ramp 2 and through a housing of the unit 6 at one end and a housing of the unit 8 at the opposite end of the bar 53. The pet climb up ramp 7 may be pivotally attached by a bar 51 which passes through ramp 7 and through a housing of the unit 6 at one end and a housing of the unit 8 at the opposite end of the bar 51, as shown in FIG. 1B. Alternatively, the pet climb up ramp 2 may be pivotally connected to the units 6 and 8 in the same or a similar manner to the climb up ramp 7. The pet climb up ramp 2 may have extensions 36 and 38 and the pet climb up ramp 7 may have extensions 37 and 39.

The collapsible sleeve 10 may include sleeve or member 10a which is pivotally connected by hinges 26a and 26b to dryer unit 6; and sleeve or member 10b which is pivotally connected by hinges 26c and 26d to member or beam 34. The collapsible sleeve 12 may include sleeve or member 12a which is pivotally connected by hinges 28a and 28b to member or beam 34; and sleeve or member 12b which is pivotally connected by hinges 28c and 28d to clean water storage unit 8.

The collapsible sleeve 14 may include sleeve or member 14a which is pivotally connected by hinges 30a and 30b to dryer unit 6; and sleeve or member 14b which is pivotally connected by hinges 30c and 30d to member or beam 34. The collapsible sleeve 16 may include sleeve or member 16a which is pivotally connected by hinges 32a and 32b to member or beam 34; and sleeve or member 16b which is pivotally connected by hinges 32c and 32d to clean water storage unit 8.

There are circular or substantially circular openings 10c, 12c, 14c, and 16c shown in the sleeves 10, 12, 14, and 16, respectively. Each circular opening of 10c, 12c, 14c, and 16c may have a diameter D2 which may be about six inches, but which may vary depending on the size of a pet, such as pet 100 in FIG. 3.

FIG. 2A shows a top, front, and right perspective view of the apparatus 1 of FIG. 1A, with the apparatus 1 of FIG. 1A shown in a second state, in which the climb up ramp 2 has been pivoted with respect to the units 6 and 8 so that a pet can walk on the ramp 2 and then onto floor or bottom members 9 and 11. Typically, one front paw of the pet, and one rear paw of the pet will be on member 9 (such as the left paws), while the other front paw and the other rear paw will be on member 11 (such as the right paws), so that the pet will be standing on the combination of members, bottoms, or floors 9 and 11.

FIG. 2B shows a top, rear, and left perspective view of the apparatus 1 of FIG. 1A, with the apparatus of FIG. 1A shown in a third state, in which the climb up ramp 7 has been pivoted with respect to the units 6 and 8 so that a pet can walk on the ramp 7 and then onto floor or bottom members 9 and 11, from the rear of the apparatus 1.

Figure 4:
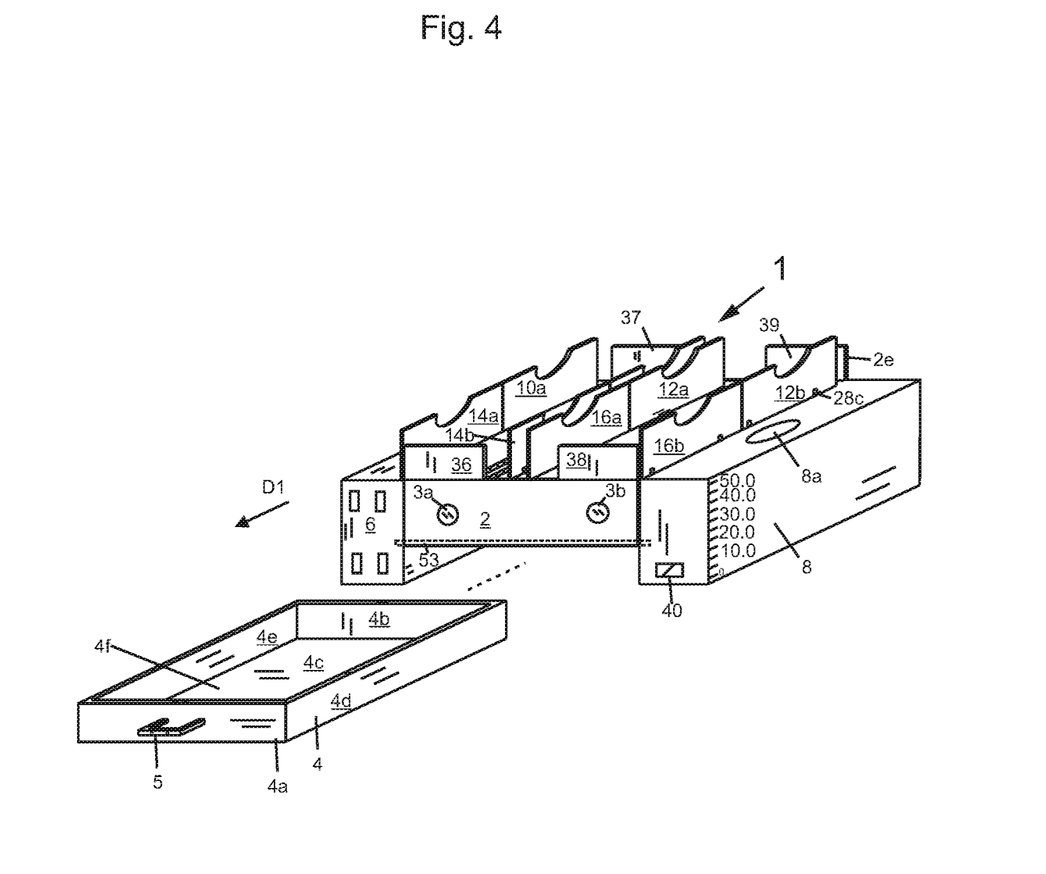
FIG. 4 shows a top, front, and right perspective view of the apparatus of FIG. 1A, with the apparatus of FIG. 1A, in a fourth state, such that the apparatus of FIG. 1A has been partially taken apart.

Each of the bottom members 9 and 11 have a plurality of openings 9a and 11a as show in FIGS. 2A and 1B. The plurality of openings 9a and 11a allow water to flow through the bottom members 9 and 11 respectively, and into an inner chamber 4f of the container 4 through an opening at the top of the container 4. The inner chamber 4f is enclosed by sides or walls 4a-b and 4d-e and bottom 4c, as shown by FIG. 4. The container 4 may have a handle 5 attached to the wall 4a for pulling the container 4 out from the rest of the apparatus 1.

The components of the apparatus 1 may all be made of various materials, such as plastic, such as a hard plastic.

The apparatus 1 may further include an on/off switch 40, including "on" side or portion 40b which when pressed or activated, provides power to both units 8 and 6 and causes the unit 8 to provide or pump water to pipes 60 and 61 which may be located underneath the floor members 9 and 11, and which provide water to pipes 62, 63, 64, 65, 66, 67, 68, and 69 as shown by the combination of FIGS. 2A and 2B. The pipes 63, 65, 67, and 69 have a plurality of openings 63a, 65a, 67a, and 69a, respectively. Clean water is provided from the unit 8 first to openings at ends 60a and 61a of pipes 60 and 61, respectively, then through the pipes 60 and 61 to the pipes 63, 65, 67, and 69 via pipes 62, 64, 66, and 68, respectively, to provide water out openings 63a, 65a, 67a, and 69a to clean a portion of a pet's body, such as, including the pet's paws.

The apparatus dryer unit 6 may provide hot air which may be blown first into pipes 70 and 71 through openings at ends 70a and 71a, shown in FIGS. 2A and 2B, respectively. After being blown into pipes 70 and 71 through openings at ends 70 and 71a, the hot air is then provided to pipes 72, 73, 74, 75, 76, 77, 78, and 79, and then out openings 73a, 75, 77a, and 79a, to dry a portion of a pet's body, such as the pet's paw, in at least one embodiment, while two paws, such as paws or legs 102 and 106 of one side of the pet, such as pet 100, are on bottom member 9, and the other two paws, such as 104 and 108 of the other side of the pet 100 are on bottom member 11, as in FIG. 3. Hot air may be provided from pipe 70 to pipes 73 and 77 via pipes 72 and 76, as shown in FIG. 2A. Hot air may also be provided from pipe 71 to pipes 75 and 79 via pipes 78 and 74, as shown in FIG. 2B. Hot air may be provided to one inner chamber where for example the left side of the pet 100 is (inner chamber bound by bottom member 9, wall 6a, member 34, and parts of ramps 2 and 7) from pipes 73 and 75 through openings 73a and 75a, respectively. Hot air may be provided to second inner chamber where for example the right side of the pet 100 is (inner chamber bound by bottom member 11, wall 8c, member 34, and parts of ramps 2 and 7) from pipes 77 and 79 through openings 77a and 79a, respectively.

With the climb up ramps 2 and 7 in the closed first state of FIGS. 1A and 1B, there is an inner chamber formed by parts of climb up ramps 2 and 7, wall 6a of the unit 6, member 34, and bottom member 9 in which typically a front paw and a rear paw of one side (such as the left side) of a pet will reside while water flows through openings 63a and 65a to be sprayed onto the pet's paws, typically on one side, such as the left side, to wash one side of the pet.

Similarly or identically, with the climb up ramps 2 and 7 in the closed first state of FIGS. 1A and 1B, there is an inner chamber formed by parts of climb up ramps 2 and 7, wall 8c of the unit 8, member 34, and bottom member 11 in which typically a front paw and a rear paw of one side (such as the right side) of a pet will reside while water flows through openings 67a and 69a, to be sprayed onto the pet's paws on one side of the pet, such as the right side, to wash one side of the pet.

The portion 40a may turn off the switch 40, while portion 40b turns the switch on for both the units 8 and 6.

Component 41 may be a water spray timer which may be set to automatically turn off the water spraying or providing of water to pipes 61-69, after a set period of time. Component 44 may be a water spray intensity controller which can be used to change the intensity of the water spraying provided by the clean water unit 8 to the pipes 61-69.

Component 43 may be a dryer intensity controller for controlling the intensity of drying provided by the dryer 6. Component 42 may control the amount of time that drying is provided by the dryer 6.

Soiled water level indicator lights 3a, 3b may be provided to indicate that the water in the inner chambers in which the pet's paws are located (the inner chamber bounded by parts of ramps 2 and 7, dryer unit wall 6a and member 34 and the inner chamber bounded by parts of ramps 2 and 7, water unit wall 8c, and the member 34) may indicate that the water in those inner chambers is dirty and needs to be released by sliding container 4 to separate it from the rest of the apparatus 1, as in FIG. 4, to dump dirty water out from the inner chamber 4f of the container 4.

There may be an internal switch provided as part of the climb up ramps 2 and 7 connected to both the dryer 6 and the water unit 8, which may automatically shut off the dryer 6 and the water unit 8 when either the ramp 2 or the ramp 7 is not in a closed state. For example, if the ramp 2 is not in a closed state as in FIG. 2A, or the ramp 7 is not in a closed state as in FIG. 2B, then internal switches connecting ramps 2 and 7 with units 6 and 8, will not allow operation of the units 6 and 8, and will shut off the units 6 and 8.

The water unit 8 has stored clean water or may be connected to a source of clean water such as a hose. In addition, a water inlet 8a may be used to fill the water unit 8 with water. The water unit 8 may include a pump that can be shut off and turned on.

The container 4 can be pulled out in the direction D1, shown in FIG. 4 from the rest of the apparatus 1 to dispose of soiled water. The ramp 2 is shown attached to the container 4, but may not be attached in other embodiments. The container 4 may be pulled out in a direction opposite to D1, shown in FIG. 4.

The container 2 has an indicator 3a which may be a light emitting diode indicator which lights green to indicate that there is not too much soiled water in the soiled water container or tray 4, and the pet paw washer or apparatus 1 can continue to be effectively used to wash a pet's paws. The container 2 also has an indicator 3b which may be a light emitting diode which lights red to indicate that there is too much soiled water in the soiled water tray or container 4 or that container 4 is full and the water should be disposed of before using apparatus 1 to wash a pet's paws.

The container 4 can be pulled out from the rest of the apparatus 1, using handle 5, in the direction D1 and the container 4 can be taken apart from the rest of the apparatus 1, in order to dispose of the water within an inner chamber of container 4. The housing or container 6 and the clean water container or housing 8 are fixed to the container 2, and acts as legs supporting the container 2, when the container 4 is pulled out and taken away from the apparatus 1.

Figure 3:
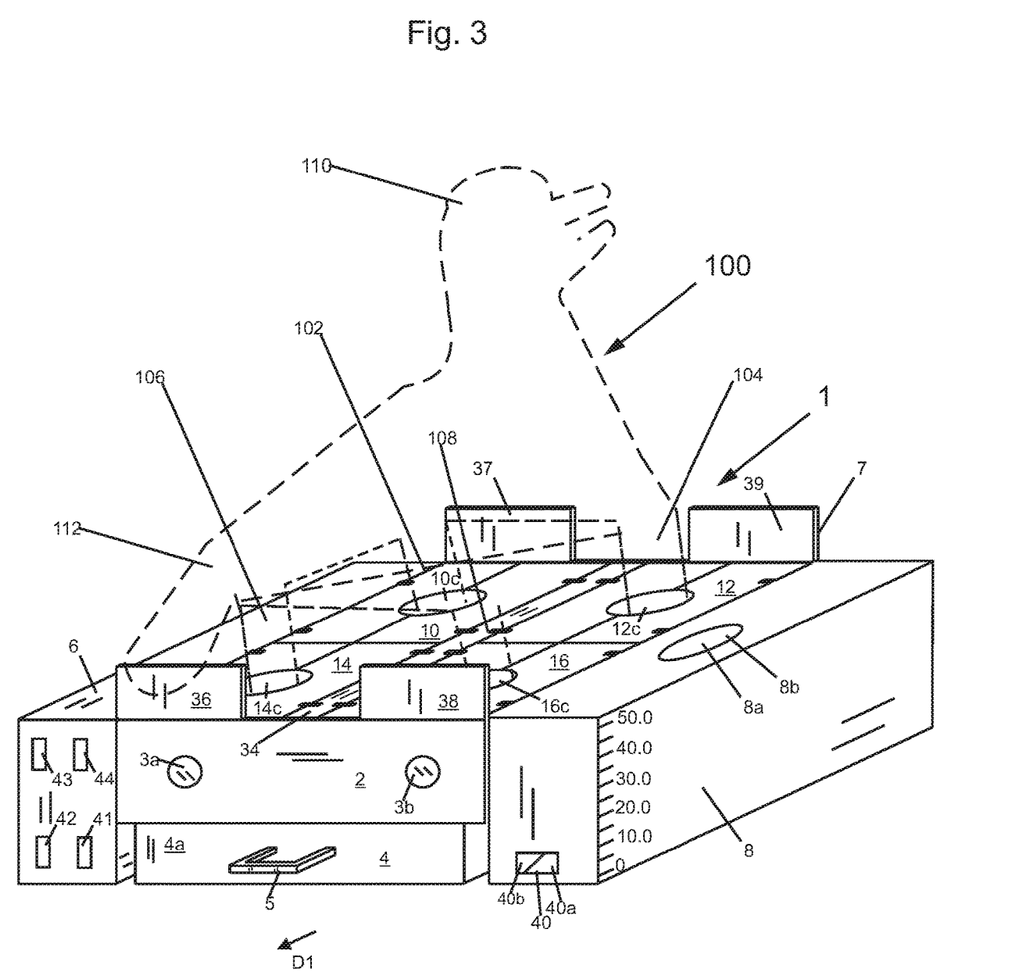
FIG. 3 shows a top, front, and right perspective view of an apparatus of FIG. 1A, with the apparatus shown in the first state of FIG. 1A, and with dashed lines showing where a pet is typically located partially in the apparatus of FIG. 1A, in the first state.

FIG. 3 shows a top, front, and right perspective view of an apparatus 1 of FIG. 1A, with the apparatus 1 shown in the first state of FIG. 1A, and with dashed lines showing where a pet 100 is typically located partially in the apparatus 1 of FIG. 1A, in the first state.

In operation, in at least one embodiment, referring to FIG. 1A, clean water is placed in water unit 8 to fill up a water storage reservoir or inner chamber 8b within the unit 8. A hose may be used to cause water to be inserted through opening 8a of housing 8 into an inner chamber 8b of the housing 8. Next, ramp 2 is lowered as shown in FIG. 2A or ramp 7 is lowered as shown in FIG. 2B for the pet to use one of the two ramps 2 or 7, while the other ramp of 2 or 7 remains in a closed state as in FIG. 1A. Before the pet 100 walks in to the inner chambers (for FIG. 2A, left side inner chamber is bordered by parts of ramps 2 and 7, wall 6a, member 34, and bottom 9, while right side inner chamber is bordered by parts of ramps 2 and 7, wall 8c, member 34 and bottom 11) the flaps, members, or sleeves 10a-b, 14a-b, 12a-b, and 16a-b are opened and/or put in a perpendicular or substantially perpendicular orientation with respect to the bottom members 9 and 11, as shown in FIGS. 2A and 2B. Next the pet 100 can walk up the ramp 2 or 7, depending on the configuration and stand on bottom members 9 and 11, while the flaps 10a-b, 14a-b, 12a-b and 16a-b are substantially perpendicular or perpendicular to bottom members 9 and 11, as shown in FIG. 2A or 2B. While the pet 100 is standing on bottoms 9 and 11, in the position shown in FIG. 3 (or in a position with facing towards the ramp 2, where the pet entered from the ramp 7), the flaps or covers 10a-b, 14a-b, 12a-b, and 16a-b are closed, to put into the orientation shown in FIGS. 1A and 1B, and with a portion of legs 102, 104, 106, and 108 of the pet 100 placed within openings 10c, 14c, 12c and 16c, respectively. In the position of FIG. 3, the bottoms of the left side paws of the left side legs 102 and 106 will be standing on bottom member 9; and the bottoms of the right side paws of the legs 104 and 108 will be standing on bottom member 11.

It is preferred to have two ramps, such ramps 2 and 7, which may be identical or substantially identical, and may operate identically or substantially identically, where ramp 2 is at the front of the apparatus 1 and the ramp 7 is opposite ramp 2, at the rear of the apparatus 1. This allows a pet 100 to enter from one ramp, such as ramp 2, and exit out an opposite ramp, such as ramp 7, without having to turn around, which would be difficult. The pet 100 thus can move forward while entering the inner chambers (inner chamber bordered by ramp 2, member 6a, member 34, ramp 7, and bottom 9, and inner chamber bordered by ramp 2, member 8c, member 34, ramp 7, and bottom 11) and also forward while exiting said inner chambers. This makes it much easier to get the pet 100 in and out of the apparatus 1, otherwise the pet would need to be lifted out of said inner chambers or backed out of the apparatus 1.

Each of the openings 10c, 14c, 12c, and 16c, may be circular or substantially circular, and may have a diameter D2 which may be configured to be smaller than the length of a paw or foot of a particular animal that the apparatus 1 is constructed for. Generally apparatus 1 may be proportionately larger or smaller, depending on the particular size animal. If a paw or foot of a dog, for example, is one foot (twelve inches) long, then each of the openings 10c, 14c, 12c, and 16c may have a diameter D2, shown in FIG. 1A, which may be about six inches, or about half the size of the length of the particular animal paw, but large enough to allow an ankle of a leg of an animal, such as a dog to sit in any one of openings 10c, 14c, 12c, and 16c, snugly, but not too tightly to irritate the ankle of the leg of the animal. FIG. 3 shows a simplified dashed line diagram of an animal 100, such as a dog. The animal 100 has legs 102, 104, 106, and 108 which partially are inserted in openings 10c, 12c, 14c, and 16c, respectively.

After the pet 100 is situated as in FIG. 3, next power is turned on to a motor within housing 6 and within water unit 8 of the apparatus 1, with a switch button and/or activation device 40. In at least one embodiment, the switch 40 is an on-off switch with an on side 40b and an off side 40a. Turning on power to both units 6 and 8, in at least one embodiment, causes clean water to spray through pipes 61-69 and through openings 63a, 65a, 67a, and 69a in order to clean the pet's paws 102, 104, 106, and 108.

The water spray duration and intensity can be adjusted based on different settings, with water intensity and/or pressure controller knob or device 44, which may be connected to a pump of the unit water 8. The dryer temperature can be adjusted with dryer intensity controller knob or device 43, which may be connected to the dryer unit 6.

After a water spray cycle is completed, the dryer 6, may automatically dry the pet paws 102, 104, 106, and 108 near or in openings 10c, 12c, 14c, and 16c. The air dry duration and intensity can be adjusted based on different settings, by controller 42, which may be connected to the dryer 6. The water duration can be adjusted by controller knob 41 which may be connected to the water unit 8.

After water spray washing and drying is completed the flaps 10a, 10b, 14a, 14b, 12a, 12b, 16a, 16b can be opened vertically, as in FIGS. 2A and 2B, and the flap ramp 2 or 7, will be placed in a downward state as in FIGS. 2A and 2B, respectively, as appropriate. Typically the ramp that the pet 100 is facing will be opened, for releasing the pet 100 from the apparatus 1. For example, ramp 7 will be lowered, to release pet 100, since the pet 100 is facing ramp 7 during the washing and drying operation, and entered from ramp 2. Preferably the ramp opposite the ramp used for the pet 100 entering, is used for the pet 100 exiting the apparatus 1 and inner chambers in which washing and drying occurred.

In at least one embodiment, when the lights 3a and 3b are lit green then the soiled water container 4 is not full and the unit or apparatus 1 is operational. In at least one embodiment, when the lights 3a and 3b are lit red then the soiled water container 4 is full and the container 4 should be drained out before the unit or apparatus 1 can be used.

The clean water storage unit 8 may be transparent, and may have indications or markings which show how much water is in a reservoir 8b of the unit 8. The markings, are shown in FIG. 1A as, and may be for example 0, 10.0, 20.0, 30.0, 40.0, and 50.0. These markings may refer to a volume of water in a reservoir 8b of the container 8, such as a number of liters, quarts, gallons, or some other units of water in reservoir 8b of the container 8.

In at least one embodiment, each of the water unit 8 and/or the dryer unit 6 may include a computer processor, computer memory, a computer monitor, and a user interactive device. The computer processor, may communicate with the computer memory, computer monitor and user interactive device. The computer processor of either water unit 8 and/or dryer unit 6 may control water supplying aspects of the water unit 8 and/or drying aspects of the dryer unit 6, such as amount of time that water is sprayed, amount of time that drying occurs, and intensity of either water spraying or water drying, as at least partially determined by computer software stored in computer memory of either unit 8 or unit 6, and/or as at least partially determined by user input through an interactive device such as a touchscreen or keypad which may be part of units 6 or 8.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a device configured to change between a first state and a second state;
a water supplying unit; and
a dryer unit;
wherein the device has one or more openings leading to one or more inner chambers;
wherein in the second state the one or more openings of the device are larger than in the first state;
wherein the device is configured so that a pet can insert one or more paws into the one or more inner chambers, through the one or more openings in the second state;
wherein the water supplying unit is configured to supply water to the one or more inner chambers to wash at least part of the one or more paws of the pet, while the one or more paws of the pet are in the one or more inner chambers;
wherein the dryer unit is configured to supply hot air to the one or more inner chambers to dry the one or more paws of the pet, while the one or more paws of the pet are in the one or more inner chambers;
wherein the device includes a first ramp;
wherein the device includes a bottom member on which the pet can stand in the first state;
wherein the first ramp is configured to be changed from a first orientation to a second orientation with respect to the bottom member to allow the pet to walk onto the bottom member by first walking onto the first ramp in the second orientation, and then off of the first ramp and onto the bottom member; and
wherein the first ramp is configured to be put back in the first orientation from the second orientation with respect to the bottom member to form part of an enclosure for retaining water and hot air inside the one or more inner chambers of the device;
wherein the one or more inner chambers include a first inner chamber and a second inner chamber;
wherein the first inner chamber is separated from the second inner chamber by a first member;
wherein the first inner chamber is within a first enclosure formed by the bottom member, the first member, a second member, the first ramp, and a third member, when the first ramp is in the first orientation with respect to the bottom member;
wherein the second inner chamber is within a second enclosure formed by the bottom member, the first member, a fourth member, the first ramp, and the third member, when the first ramp is in the first orientation with respect to the bottom member;
wherein the first member is spaced apart from the second member;
wherein the first member is spaced apart from the fourth member;
wherein the first ramp is spaced apart from the third member;
wherein the first inner chamber can be accessed through at least one of the one or more openings from above the first inner chamber, and simultaneously through an opening formed by placing the first ramp into the second orientation with respect to the bottom member; and
wherein the second inner chamber can be accessed through at least one of the one or more openings from above the second inner chamber, and simultaneously through an opening formed by placing the first ramp into the second orientation with respect to the bottom member.

2. The apparatus of claim 1 wherein
the first ramp is substantially perpendicular to the bottom member in the first orientation.

3. The apparatus of claim 1 wherein
the device includes a second ramp;
wherein the second ramp is configured to be changed from a third orientation to a fourth orientation with respect to the bottom member to allow the pet to walk onto the bottom member by first walking onto the second ramp in the fourth orientation, and then off of the second ramp and onto the bottom member;
wherein the second ramp is configured to be put back into the third orientation from the fourth orientation with respect to the bottom member to form part of an enclosure for retaining water and hot air inside the one or more inner chambers of the device; and
wherein the first ramp is located opposite the second ramp.

4. The apparatus of claim 3 wherein
the first ramp is substantially perpendicular to the bottom member in the first orientation;
the second ramp is substantially perpendicular to the bottom member in the third orientation.

5. The apparatus of claim 1 wherein
the device includes one or more pipes which are connected to the water supplying unit, which are located in the one or more inner chambers of the device, and which have a plurality of openings through which water is supplied to the one or more inner chambers of the device; and
the device includes one or more pipes which are connected to the dryer unit, which are located in the one or more inner chambers of the device, and which have a plurality of openings through which hot air is supplied to the one or more inner chambers of the device.

6. The apparatus of claim 1 wherein
the bottom member includes a plurality of openings through which water can pass from inside the one or more inner chambers to flow out of the one or more inner chambers.

7. The apparatus of claim 6 wherein
the device includes a drawer;
wherein the drawer is configured to be placed in a collecting state such that the drawer is underneath the bottom member, and collects water which passes from inside the one or more inner chambers through the plurality of openings of the bottom member to outside the one or more inner chambers; and
wherein the drawer is configured to be placed in a removed state, such that the drawer is no longer beneath the bottom member which allows water that has been collected by the drawer to be dumped out of the drawer.

8. The apparatus of claim 1 wherein
the first ramp has first and second extensions which are spaced apart, such that the first member is between the first and second extensions.

9. The apparatus of claim 1 wherein
the first inner chamber has a first perimeter bound by the first member, the bottom member, the second member, the first ramp, and the third member;
wherein the first perimeter encloses a first area;
wherein all of the first area is exposed in the second state;

wherein the second inner chamber has a second perimeter bound by the first member, the bottom member, the fourth member, the first ramp, and the third member;
wherein the second perimeter encloses a second area; and
wherein all of the second area is exposed in the second state.

10. The apparatus of claim 1 further comprising
a container which spans approximately a length of the bottom member; and
wherein there are a plurality of openings in the bottom member which span approximately a length of the bottom member, and which permit water to pass through the plurality of openings of the bottom member and into the container.

11. An apparatus comprising:
a device which is configured to change between a first state and a second state;
a water supplying unit; and
a dryer unit;
wherein the device has one or more openings leading to one or more inner chambers;
wherein in the second state the one or more openings of the device are larger than in the first state;
wherein the device is configured so that a pet can insert one or more paws into the one or more inner chambers, through the one or more openings in the second state;
wherein the water supplying unit is configured to supply water to the one or more inner chambers to wash at least part of the one or more paws of the pet, while the one or more paws of the pet are in the one or more inner chambers;
wherein the dryer unit is configured to supply hot air to the one or more inner chambers to dry the one or more paws of the pet, while the one or more paws of the pet are in the one or more inner chambers;
wherein
the device includes a first left front flap and a second left front flap; a first left rear flap and a second left rear flap; a first right front flap and a second right front flap; and a first right rear flap and a second right rear flap;
wherein the device includes a bottom member on which the pet can stand in the first state or the second state;
wherein in the second state, the first left front flap, the second left front flap, the first left rear flap, the second left rear flap, the first right front flap, the second right front flap, the first right rear flap, the second right rear flap are at an angle to the bottom member;
wherein in the first state, the first left front flap, the second left front flap, the first left rear flap, the second left rear flap, the first right front flap, the second right front flap, the first right rear flap, and the second right rear flap are substantially parallel to the bottom member;
wherein a first opening of the one or more openings is formed between the first left front flap and the second left front flap which is smaller in the first state than the second state, to provide greater restriction to movement of a first paw of the pet in the first state than in the second state;
wherein a second opening of the one or more openings is formed between the first left rear flap and the second left rear flap which is smaller in the first state than the second state, to provide greater restriction to movement of a second paw of the pet in the first state than in the second state;
wherein a third opening of the one or more openings is formed between the first right front flap and the second right front flap which is smaller in the first state than the second state, to provide greater restriction to movement of a third paw of the pet in the first state than in the second state; and
wherein a fourth opening of the one or more openings is formed between the first right rear flap and the second right rear flap which is smaller in the first state than the second state, to provide greater restriction to movement of a fourth paw of the pet in the first state than in the second state;
wherein the one or more inner chambers include a first inner chamber and a second inner chamber;
wherein the first inner chamber is separated from the second inner chamber by a first member;
wherein the first inner chamber is within a first enclosure formed by the bottom member, the first member, a second member, the first ramp, and a third member, when the first ramp is in the first orientation with respect to the bottom member;
wherein the second inner chamber is within a second enclosure formed by the bottom member, the first member, a fourth member, the first ramp, and the third member, when the first ramp is in the first orientation with respect to the bottom member;
wherein the first member is spaced apart from the second member;
wherein the first member is spaced apart from the fourth member;
wherein the first ramp is spaced apart from the third member;
wherein the first inner chamber can be accessed through at least one of the one or more openings from above the first inner chamber, and simultaneously through an opening formed by placing the first ramp into the second orientation with respect to the bottom member;
wherein the second inner chamber can be accessed through at least one of the one or more openings from above the second inner chamber, and simultaneously through an opening formed by placing the first ramp into the second orientation with respect to the bottom member;
wherein each of the second left front flap, the second right front flap, the second left rear flap, and the second right rear flap is rotatably connected to the first member;
wherein each of the first left front flap, and the first left rear flap is rotatably connected to the second member; and
wherein each of the first right front flap, and the first right rear flap is rotatably connected to the fourth member.

12. The apparatus of claim 11 wherein
in the second state, the first left front flap, the second left front flap, the first left rear flap, the second left rear flap, the first right front flap, the second right front flap, the first right rear flap, the second right rear flap are substantially perpendicular to the bottom member.

13. A method comprising:
changing a device from a first state to a second state;
inserting one or more paws of a pet into one or more inner chambers of the device in the second state;
changing the device back from the second state to the first state to greater restrict the movement of the one or more paws of the pet in the one or more inner chambers of the device;
supplying water to the one or more inner chambers to wash at least part of the one or more paws of the pet, while the one or more paws of the pet are in the one or more inner chambers and while the device is in the first state; and supplying hot air to the one or more inner chambers to dry the one or more paws of the pet, while the one or more paws of the pet are in the one or more inner chambers, and while the device is in the first state;

wherein the device includes a first ramp;

wherein the device includes a bottom member on which the pet can stand in the first state;

wherein the first ramp is configured to be changed from a first orientation to a second orientation with respect to the bottom member to allow the pet to walk onto the bottom member by first walking onto the first ramp in the second orientation, and then off of the first ramp and onto the bottom member;

wherein the first ramp is configured to be put back in the first orientation from the second orientation with respect to the bottom member to form part of an enclosure for retaining water and hot air inside the one or more inner chambers of the device;

wherein the one or more inner chambers include a first inner chamber and a second inner chamber;

wherein the first inner chamber is separated from the second inner chamber by a first member;

wherein the first inner chamber is within a first enclosure formed by the bottom member, the first member, a second member, the first ramp, and a third member, when the first ramp is in the first orientation with respect to the bottom member;

wherein the second inner chamber is within a second enclosure formed by the bottom member, the first member, a fourth member, the first ramp, and the third member, when the first ramp is in the first orientation with respect to the bottom member;

wherein the first member is spaced apart from the second member;

wherein the first member is spaced apart from the fourth member;

wherein the first ramp is spaced apart from the third member;

wherein the first inner chamber can be accessed through at least one of the one or more openings from above the first inner chamber, and simultaneously through an opening formed by placing the first ramp into the second orientation with respect to the bottom member; and wherein the second inner chamber can be accessed through at least one of the one or more openings from above the second inner chamber, and simultaneously through an opening formed by placing the first ramp into the second orientation with respect to the bottom member.

14. The method of claim 13 wherein
the first ramp is substantially perpendicular to the bottom member in the first orientation.

15. The method of claim 13 wherein
the device includes a second ramp;
wherein the second ramp is configured to be changed from a third orientation to a fourth orientation with respect to the bottom member to allow the pet to walk onto the bottom member by first walking onto the second ramp in the fourth orientation, and then off of the second ramp and onto the bottom member;
wherein the second ramp is configured to be put back in the third orientation from the fourth orientation with respect to the bottom member to form part of an enclosure for retaining water and hot air inside the one or more inner chambers of the device; and
wherein the first ramp is located opposite the second ramp.

16. The method of claim 15 wherein
the first ramp is substantially perpendicular to the bottom member in the first orientation;
the second ramp is substantially perpendicular to the bottom member in the third orientation.

17. The method of claim 13 wherein
the device includes one or more pipes which are connected to the water supplying unit, which are located in the one or more inner chambers of the device, and which have a plurality of openings through which water is supplied to the one or more inner chambers of the device; and
the device includes one or more pipes which are connected to the dryer unit, which are located in the one or more inner chambers of the device, and which have a plurality of openings through which hot air is supplied to the one or more inner chambers of the device.

18. The method of claim 13 wherein
the bottom member includes a plurality of openings through which water can pass from inside the one or more inner chambers to flow out of the one or more inner chambers.

19. The method of claim 18 wherein
the device includes a drawer;
wherein the drawer is configured to be placed in a collecting state such that the drawer is underneath the bottom member, and collects water which passes from inside the one or more inner chambers through the plurality of openings of the bottom member to outside the one or more inner chambers; and
wherein the drawer is configured to be placed in a removed state, such that the drawer is no longer beneath the bottom member which allows water that has been collected by the drawer to be dumped out of the drawer.

20. The method of claim 13 wherein
the first ramp has first and second extensions which are spaced apart, such that the first member is between the first and second extensions.

21. The apparatus of claim 13 wherein
the first inner chamber has a first perimeter bound by the first member, the bottom member, the second member, the first ramp, and the third member;
wherein the first perimeter encloses a first area;
wherein all of the first area is exposed in the second state;
wherein the second inner chamber has a second perimeter bound by the first member, the bottom member, the fourth member, the first ramp, and the third member;
wherein the second perimeter encloses a second area; and
wherein all of the second area is exposed in the second state.

22. The method of claim 13 further comprising
a container which spans approximately a length of the bottom member; and
wherein there are a plurality of openings in the bottom member which span approximately a length of the bottom member, and which permit water to pass through the plurality of openings of the bottom member and into the container.

23. An apparatus comprising:
a device configured to change between a first state and a second state;
a water supplying unit configured to supply water to one or more inner chambers;

a dryer unit configured to supply heat to the one or more inner chambers;

a container;

wherein the device has one or more openings leading to the one or more inner chambers;

wherein in the second state the one or more openings of the device are lamer than in the first state;

wherein the device is configured so that a pet can insert one or more paws into the one or more inner chambers, through the one or more openings in the second state;

wherein the water supplying unit is configured to supply water to the one or more inner chambers to wash at least part of the one or more paws of the pet, while the one or more paws of the pet are in the one or more inner chambers;

wherein the dryer unit is configured to supply hot air to the one or more inner chambers to dry the one or more paws of the pet, while the one or more paws of the pet are in the one or more inner chambers;

wherein the device includes a first ramp;

wherein the device includes a bottom member on which the pet can stand in the first state;

wherein the first ramp is configured to be changed from a first orientation to a second orientation with respect to the bottom member to allow the pet to walk onto the bottom member by first walking onto the first ramp in the second orientation, and then off of the first ramp and onto the bottom member; and wherein the first ramp is configured to be put back in the first orientation from the second orientation with respect to the bottom member to form part of an enclosure for retaining water and hot air inside the one or more inner chambers of the device;

wherein the one or more inner chambers are between the dryer unit and the water unit;

wherein the container is configured to slide in and out of a region beneath the bottom member and between the dryer unit and the water unit.

24. A method comprising:

changing a device from a first state to a second state;

inserting one or more paws of a pet into one or more inner chambers of the device in the second state;

changing the device back from the second state to the first state to greater restrict the movement of the one or more paws of the pet in the one or more inner chambers of the device;

supplying water via a water unit to the one or more inner chambers to wash at least part of the one or more paws of the pet, while the one or more paws of the pet are in the one or more inner chambers and while the device is in the first state; and supplying hot air via a dryer unit to the one or more inner chambers to dry the one or more paws of the pet, while the one or more paws of the pet are in the one or more inner chambers, and while the device is in the first state;

wherein the device includes a first ramp;

wherein the device includes a bottom member on which the pet can stand in the first state;

wherein the first ramp is configured to be changed from a first orientation to a second orientation with respect to the bottom member to allow the pet to walk onto the bottom member by first walking onto the first ramp in the second orientation, and then off of the first ramp and onto the bottom member; and wherein the first ramp is configured to be put back in the first orientation from the second orientation with respect to the bottom member to form part of an enclosure for retaining water and hot air inside the one or more inner chambers of the device;

wherein the device further comprises:

a container;

wherein the one or more inner chambers are between the dryer unit and the water unit; and wherein the container is configured to slide in and out of a region beneath the bottom member and between the dryer unit and the water unit.

25. An apparatus comprising:

a device configured to change between a first state and a second state;

wherein the device has first and second openings leading to a first inner chamber;

wherein the device has third and fourth openings leading to a second inner chamber;

wherein the first inner chamber and the second inner chamber are separated by a first member;

wherein the first and second openings are separate and apart from each other in the first state;

wherein the third and fourth openings are separate and apart from each other in the first state;

wherein in the second state the first and second openings are contiguous and form a continuous left side opening;

wherein in the second state the third and fourth openings are contiguous and form a continuous right side opening;

wherein the device is configured so that a pet's first and second left side paws are more restricted in movement when the first and second left side paws are in the first and second openings, respectively, in the first inner chamber, and in the first state than when the first and second left side paws are in the first and second openings, respectively, in the first inner chamber, and in the second state; and wherein the device is configured so that a pet's first and second right side paws are more restricted in movement when the first and second right side paws are in the third and fourth openings, respectively, in the second inner chamber, and in the first state than when the first and second left side paws are in the third and fourth openings, respectively, in the second inner chamber, and in the second state.

26. The apparatus of claim 25 further comprising a first ramp;

a bottom member which forms a bottom of the first and second inner chambers;

wherein the first ramp is configured to be changed from a first orientation to a second orientation with respect to the bottom member to allow a pet to walk onto the bottom member by first walking onto the first ramp in the second orientation, and then off of the first ramp and onto the bottom member; and wherein the first ramp is configured to be put back in the first orientation from the second orientation with respect to the bottom member to form part of an enclosure which encloses the first and second inner chambers.

27. A method comprising washing one or more of a paws of a pet using an apparatus, wherein the apparatus includes a device configured to change between a first state and a second state and wherein the one or more pet's paws are washed in the first state and while first and second left side paws are in a first inner chamber of the apparatus and first and second right side paws are in a second inner chamber of the apparatus;

the apparatus comprising:

the device configured to change between the first state and the second state;

wherein the device has first and second openings leading to the first inner chamber;

wherein the device has third and fourth openings leading to the second inner chamber;

wherein the first inner chamber and the second inner chamber are separated by a first member;

wherein the first and second openings are separate and apart from each other in the first state;

wherein the third and fourth openings are separate and apart from each other in the first state;

wherein in the second state the first and second openings are contiguous and form a continuous left side opening;

wherein in the second state the third and fourth openings are contiguous and form a continuous right side opening;

wherein the device is configured so that a pet's first and second left side paws are more restricted in movement when the first and second left side paws are in the first and second openings, respectively, in the first inner chamber, and in the first state than when the first and second left side paws are in the first and second openings, respectively, in the first inner chamber, and in the second state; and wherein the device is configured so that a pet's first and second right side paws are more restricted in movement when the first and second right side paws are in the third and fourth openings, respectively, in the second inner chamber, and in the first state than when the first and second left side paws are in the third and fourth openings, respectively, in the second inner chamber, and in the second state.

28. The method of claim 27 wherein the apparatus includes:

a first ramp;

a bottom member which forms a bottom of the first and second inner chambers;

wherein the first ramp is configured to be changed from a first orientation to a second orientation with respect to the bottom member to allow a pet to walk onto the bottom member by first walking onto the first ramp in the second orientation, and then off of the first ramp and onto the bottom member; and wherein the first ramp is configured to be put back in the first orientation from the second orientation with respect to the bottom member to form part of an enclosure which encloses the first and second inner chambers.

* * * * *